Patented Feb. 25, 1930

1,748,260

UNITED STATES PATENT OFFICE

GEORGES VIARD, OF PARIS, FRANCE

METHOD OF CONNECTING THE QUADS OF AN INTERURBAN CABLE WITH THE UNITS OF LOADING COILS AT THE LOADING POINTS

No Drawing. Application filed June 22, 1926, Serial No. 117,880, and in France October 9, 1925.

It is well known that interurban cables consist, in the most general case, of groups of four conductors suitably asembled and called "quads". A quad, in a "duplex cable" permits three circuits, namely, 2 physical (or side) circuits and 1 phantom (or superimposed) circuit.

In order to weaken the deleterious effects of capacity, each quad is connected, at regularly spaced points, to groups of reactance coils according to the Pupin method. A group of coils, appertaining to the three circuits of a quad, is called a "unit" or "unit of load".

The points of connection are called "loading points" and the cable between the two loading points is called a "section".

At each loading point the "unit" appertaining to the same cable is contained in one or more pots.

In a section, the values of the mutual capacities of the circuits of each type should be comprised between two limits given in the cable specifications and including the nominal value of this capacity. These mutual capacities are measured after the completion of each "section".

Here the term mutual capacity of an actual or phantom circuit means the capacity which can be measured between the outgoing and incoming conductor or conductors by assuming they are as much as possible in the actual conditions of use.

Moreover the inductances of the units (inductance for the first side circuit, inductance for the second side circuit, inductance for the phantom circuit) are measured in the factory for each loading coil pot; they should be comprised, for each type of circuit, between two given limits including the nominal values.

If the capacities of the quads in one section and the inductances of the units of load in a pot were all rigorously equal to the nominal values it would be possible to connect the quads with the units in any order provided that they are of corresponding types, and the transmission qualities of the system would always be at its best.

In certain known methods of connections, the arrangement is such that two circuits do not systematically use adjacent coils, in all the loading coil pots of a trunk cable included between two repeater stations, and this in such a manner as to avoid as much as possible cross talk between circuits.

A new method of connection at a loading point of the quads to the units will now be described. This method is based on considerations foreign to cross talk between circuits but it does not exclude methods capable of reducing these influences. The purpose of this new method is to obtain uniformity of impedance and uniformity of attenuation in a circuit and to render the different circuits more similar amongst themselves.

This method enables these uniformities to be obtained although the values of the capacities and of the inductances may deviate from the nominal values.

In accordance with the present invention there is obtained an impedance-frequency curve absolutely regular for a circuit, if those conductors of successive sections are taken which have the same value for mutual capacity (or values as close together as possible) and if coils of the same value (or values as close together as possible) of inductance are introduced in each of the successive loading points in the circuit of said conductors.

It is known, generally, that the natural impedance, and also the coefficient of attenuation of a circuit in a coil loaded cable, is a function of the ratio $\frac{L}{C}$, L being the inductance introduced into this circuit at each loading point, and C the mutual capacity of the circuit in a loading section.

In accordance with this property it will be seen that it is necesary to associate circuits of large mutual capacity with coils of large inductance, and circuits of small mutual capacity to coils of small inductance, and that, in this manner, not only by reason of the longitudinal uniformity obtained in the manner stated above, each circuit has a better impedance-frequency curve, but also that the circuits of the same type tend to have the same impedance and the same coefficient of attenuation.

Generally speaking, if the values of L and of C deviate in the same direction by $n$ per cent of their nominal values the equation $\frac{L}{C}$ remains constant, and consequently the natural impedance and the coefficient of attenuation remain constant with great approximation.

What has been described above will be realized by operating at each loading point with a selection based on the computation of the capacities of all the conductors in the cable and of all the inductances of the coils appertaining to the conductors.

This operation is extremely simple. The results obtained in practice strongly confirm the above explained method.

The method which has been set forth may be improved by not indiscriminately allocating any pot of coils to any loading point but by effecting a methodical distribution of the pots of a collection of manufactured load coils of known inductances between different loading points corresponding with as assemblage of "sections" of cable already installed and of which the mutual capacities of the conductors in the circuits are in the manner known.

There is chosen, for each loading point under consideration, that pot in which the distribution of the deviations of the inductances agree the best with distribution of the deviations of the mutual capacities determined in the adjacent sections.

It is also possible, in certain cases, when inserting into the box the manufactured units, to take into account the results of the measurement of the mutual capacities already made on given sections of a cable. Each pot of coils would then be composed by suitable selection on manufactured coils in such a manner as to make them correspond with the capacities of the conductors in the sections bordering upon a loading point.

All that precedes is also applicable in the case of interurban cables in which there are no phantom communications. The preceding selections and distributions of pots of coils are then simpler.

What I claim is:—

1. A method of connecting the quads of successive sections of an interurban cable with units of inductance at successive loading points between the sections, which comprises, taking in the successive sections, those conductors which have substantially the same value of mutual capacity, and inserting in the circuits of these conductors at successive loading points, inductance coils having substantially the same inductance value, said conductor circuits of large mutual capacity being connected at successive loading points with coils of large inductance value, and conductor circuits of small mutual capacity being connected at successive loading points with coils of small inductance value, whereby, a regular impedance frequency curve and a uniformity of natural impedance and co-efficients of attenuation are obtained in each conductor circuit contained in the cable.

2. A method as set forth in claim 1 characterized by the fact that coil boxes are distributed among the several loading points according to their inductance values in such a manner that they fit electrically as close as possible with the circuits of the cable sections to be connected.

3. A method as set forth in claim 1 characterized by the fact that after the coils are inserted into successive coil boxes, the results of the measurements of the operating capacities of sections of cable already laid are used to determine the arrangement of the coils in the different coil boxes.

In testimony whereof I have signed my name to this specification.

GEORGES VIARD.